United States Patent [19]

Leiber et al.

[11] 3,887,240
[45] June 3, 1975

[54] ANTILOCK CONTROL SYSTEM FOR VEHICLES

[75] Inventors: Heinz Leiber; Jurgen Gerstenmeier, both of Leimen; Wolfgang Korasiak, Ketsch, all of Germany

[73] Assignee: Teldix GmbH, Heidelberg, Germany

[22] Filed: Dec. 6, 1973

[21] Appl. No.: 422,145

[30] Foreign Application Priority Data
Dec. 6, 1972 Germany............................ 2259724
Aug. 7, 1973 Germany............................ 2339912

[52] U.S. Cl. ................................. 303/21 P; 303/20
[51] Int. Cl. ................................................ B60t 8/08
[58] Field of Search .............. 188/181; 303/20, 21; 307/10 R; 317/5; 324/161–162; 340/53, 62, 262–263

[56] References Cited
UNITED STATES PATENTS

| 3,653,727 | 4/1972 | Kullberg et al. | 303/21 P |
| 3,702,205 | 11/1972 | Arai et al. | 303/21 BE X |
| 3,737,201 | 6/1973 | Okamoto et al. | 303/21 A |
| 3,791,702 | 2/1974 | Burckhardt et al. | 303/21 BE |
| 3,794,389 | 2/1974 | Davis et al. | 303/21 P |

Primary Examiner—Trygve M. Blix
Assistant Examiner—Stephen G. Kunin
Attorney, Agent, or Firm—Spencer & Kaye

[57] ABSTRACT

An antilock control system for vehicles comprises at least two rotary behavior sensors associated with different wheels or wheel groups, an evaluation channel for evaluating signals from the sensors, switching apparatus for connecting the sensors to the evaluation channel in sequence and for connecting the output to the associated brake control channels, and storage apparatus in the control channels for storing signals from the evaluation channel for use when the evaluation channel is disconnected from the particular control channel.

38 Claims, 7 Drawing Figures

FIG. 7

ANTILOCK CONTROL SYSTEM FOR VEHICLES

BACKGROUND OF THE INVENTION

The invention relates to an antilock control system for vehicles, in which at least two sensors are provided associated with the vehicle wheels. From these sensors, signals characterizing the rotary behavior of the wheels are obtained. These signals are associated with different wheels or groups of wheels. The signals derived from these sensors are connected alternately or in sequence to an evaluation channel, the signals which appear one after the other at the output of the channel being used for varying the brake pressure at the wheel brakes of the wheels associated with the individual sensors, in dependence on the sensor signals which have caused the output signals to arise.

According to a previously proposed system, the expenditure for an antilock control system is substantially reduced by using only one transmission and evaluation channel to which the sensors are connected one after the other. The control signals which are produced by the channel one after the other in dependence on the sensor signals are then used for brake pressure variation at the wheel brakes of the wheels associated with the individual sensors. In accordance with the state of the art on which the prior system was based, a plurality of control channels were provided which, for example, each comprise a pulse generator as sensor, a converter for each sensor and an evaluation circuit for each sensor which responds to slip signals, to acceleration/deceleration signals or to both types of signal. The same control principles are involved in the evaluation circuit of the prior system and in the present invention. The particular control principle used is not of any importance either in the prior system or in the present invention. In the same way, it is not important exactly what method of brake pressure variation is used for example, the variation may be undertaken by means of valves connected into the brake line or by means of a modulator.

In accordance with an important embodiment of the prior system, continued sequential switching forward of the sensor switching is interrupted if a signal appears, produced in dependence on the sensor signal, for reducing the brake pressure or maintaining the brake pressue constant at the brake(s) associated with this sensor until the wheel or wheels belonging thereto are again operative in the stable speed range. This in some circumstances takes an appreciable time. Control of the brake pressure at the other wheels is not possible during this time, so that the wheels can slip more than necessary and depart significantly from the desired slip.

SUMMARY OF THE INVENTION

It is an object of the invention to modify the previously proposed system while retaining its advantages so that, in fact, a control of the pressure at the individual wheels can take place.

It is a further object of the invention to reduce the time expenditure for this control for the individual wheels as much as possible so that in a relatively short rhythm, control of all the wheels to be controlled can be achieved.

According to the invention there is provided an antilock control system for the wheel brakes of the wheels of a vehicle comprising at least two sensors, each associated with a different wheel or group of wheels and providing signals related to the rotary behavior of said wheels, an evaulation channel for evaluating signals fed to it from said sensors, first switching means for connecting said sensors to said evaluation channel in succession in a rhythm independent of the control of said control system, at least two control channels for controlling brake pressure at the wheels associated with said sensors, second switching means acting in synchronism with said first switching means for switching the output of said evaluation channel in succession to said control channels and storage means connected into said control channels for storing signals from said evaluation channel for use in the associated control channel when said associated control channel is disconnected by said second switching means from said evaluation channel.

BRIEF DESCRIPTION OF THE DRAWINGS

The invention will now be described in greater detail, by way of example, with reference to the drawings in which.

DESCRIPTION OF THE PREFERRED EMBODIMENTS

The essence of the invention resides in the fact that signals can be switched through in a rhythm independent of the control, but nevertheless, a control of the individual wheel brake pressure is possible which can be extended if necessary. This is made possible by a subsequent storage of the control signals for at least a predetermined time. As will be shown later, the timing of the pulses of a clock pulse generator can also be varied in dependence on the rotary behavior of the wheels.

Feeding the signals, derived from the sensors, to the evaluation channel can be undertaken in a specified fixed clock pulse time. This method is particularly advisable where intermediate stores are associated with the sensors, for storing the signals derived therefrom. Thus, for example, when using speed sensors, a pulse sequence can be produced, the frequency of which is proportional to the wheel speed, a counter for determining the wheel speed can be associated with each sensor and the measured value can be stored in intermediate stores. These intermediate stores are then connected one after the other by switch means to the evaluation channel. Here the duration of the interrogration clock pulse is only determined by the evaluation time of the evaluation circuit. It can therefore be correspondingly fast. The storage means will therefore, in this case, influence the control elements for the entire time, that is to say until a new control signal arrives.

Fixed clock timing can also be used where the sensors are connected directly to the evaluation channel and the measurement, for example, of the wheel speed, takes place in the latter. Here the fixed clock pulse timing is determined by the measuring time of, for example, the wheel speed and the evaluation time and this time is therefore longer.

In the case where the measurement of the rotary speed is effected in the evaluation channel by measurement of an associated period duration, or of a duration dependent thereon, e.g. ½ or 2 period lengths, for example by counting means, the switch forward rhythm can be made dependent on this duration. For this, the switch means for the alternating or sequential connection of the generators is constructed accordingly. Further details of this will be given hereafter. Since here too the measuring time required for the speed measurement enters into the clock pulse timing, the signals fed into the store will in most cases, not be able to act on the control channels until the next control signal for this control channel is produced, but only for a predetermined time. This time can also be made variable.

To achieve the subsequent storage effect, a known time element or even a monostable trigger circuit can be used for each control channel in which subsequent storage is desired. The time constant of these elements, which determine the subsequent storage time, can be made variable. Also a storage element can be used which is cleared by an external timing signal on expiry of the desired time. However it is also possible, towards the end of a clock pulse time, with the presence of signals requiring a brake pressure variation, to take a desired brake pressure from the present (controlled) brake pressure, to store the corresponding valve and to have the valves actuated by a comparator element in the sense of matching the actual brake pressure to the desired brake pressure. Here the desired brake pressure, particularly a percentage of the pressure measured, can be dependent on different values. Preferably voltages are produced which correspond to the pressures and these voltages are compared or influenced.

The system in accordance with the invention can be so controlled that the storage means, when a predetermined wheel deceleration is presents becomes operative at the end of the clock pulse time, these storage means initiating a pressure reduction.

For this purpose, shortly before the end of the clock pulse time, the deceleration signal present, or a signal derived therefrom, can be fed to a storage element, for example, a time element, the time element effecting an extension of this signal. The deceleration signal can be fed to the time element upon its occurrence. In this case if the sensed deceleration signal disappears shortly before the end of the clock pulse time, a subsequent storage likewise takes place, but for a shorter time. Also, when storing the desired pressure value this is preferably undertaken towards the end of the clock pulse time.

The subsequent storage can be initiated also by the occurrence of a predetermined, particularly relatively large, wheel slip, instead of by a deceleration signal. A construction is also possible in which both signals can initiate the subsequent storage. The considerations employed in connection with the subsequent storage in the case of wheel deceleration, also apply here.

In accordance with a further form of the invention, the subsequent storage time or the desired value of the brake pressure can be varied by the level of deceleration and/or of wheel slip, i.e. as the wheel slip or deceleration becomes larger an extension of the subsequent storage time takes place or a reduction in the desired value occurs. A high deceleration or a high wheel slip indicate a road surface with a low coefficient of friction $\mu$ which requires a stronger i.e. larger pressure reduction. Moreover, the subsequent storage time can be made dependent on the brake pressure of the associated brake channel, i.e. the subsequent storage time decreases with increasing pressure. In the case of a high pressure, a more rapid pressure reduction occurs. Furthermore, the temperature of the brake medium can be taken into account in the subsequent storage, i,e. with increasing temperature, a shortening of the storage time is effected. At higher temperatures the pressure reduction rate is likewise greater.

Instead of subsequent storage in the case of wheel deceleration and/or wheel slip, but preferably in addition thereto a subsequent storage can be undertaken also if a certain (high) wheel acceleration value occurs, which effects a pressure increase beyond the end of the clock pulse time. Here too the subsequent storage time or the level of the desired pressure value can be made dependent on the level of the acceleration itself (the higher the acceleration, the longer the time or the higher the desired value), on the level of the brake pressure difference operative at the valve (the higher the pressure, the longer the time and the higher the desired value) or on the level of the temperature (the higher the temperature, the shorter the time or the lower the desired value).

In accordance with a further form of the invention the length of the individual clock pulse times can be further shortened or extended under certain conditions. If, for example, in the course of the individual clock pulse times, because of a certain rotary wheel behavior, it is desired to keep the pressure constant (or to achieve a slight pressure rise that is equivalent), then this state can be made operative and after a short time (e.g. 5 msec) the continuing clock pulse time is broken off and the next sensor is connected. This constant pressure or slight rise state is always operative when using the three states "increase pressure," "maintain constant pressure" or "reduce pressure" when switching over to the other channels, if another state is not generated by the subsequent storage. For example, a signal produced as a result of a certain wheel acceleration or also the falling below of a predetermined slip threshold can serve as the signal for rendering "maintain constant pressure" and thus for initiating switching forward when using a subsequent storage for a pressure increase at a relatively high wheel acceleration this signal is produced at a smaller wheel acceleration). Also, with the occurrence of a certain wheel deceleration, a shortening of the clock pulse time can be undertaken. On the other hand, with the presence of a relatively high wheel slip, an extension by a predetermined time (e.g. to 40 msec.) can be undertaken.

Figure 1:
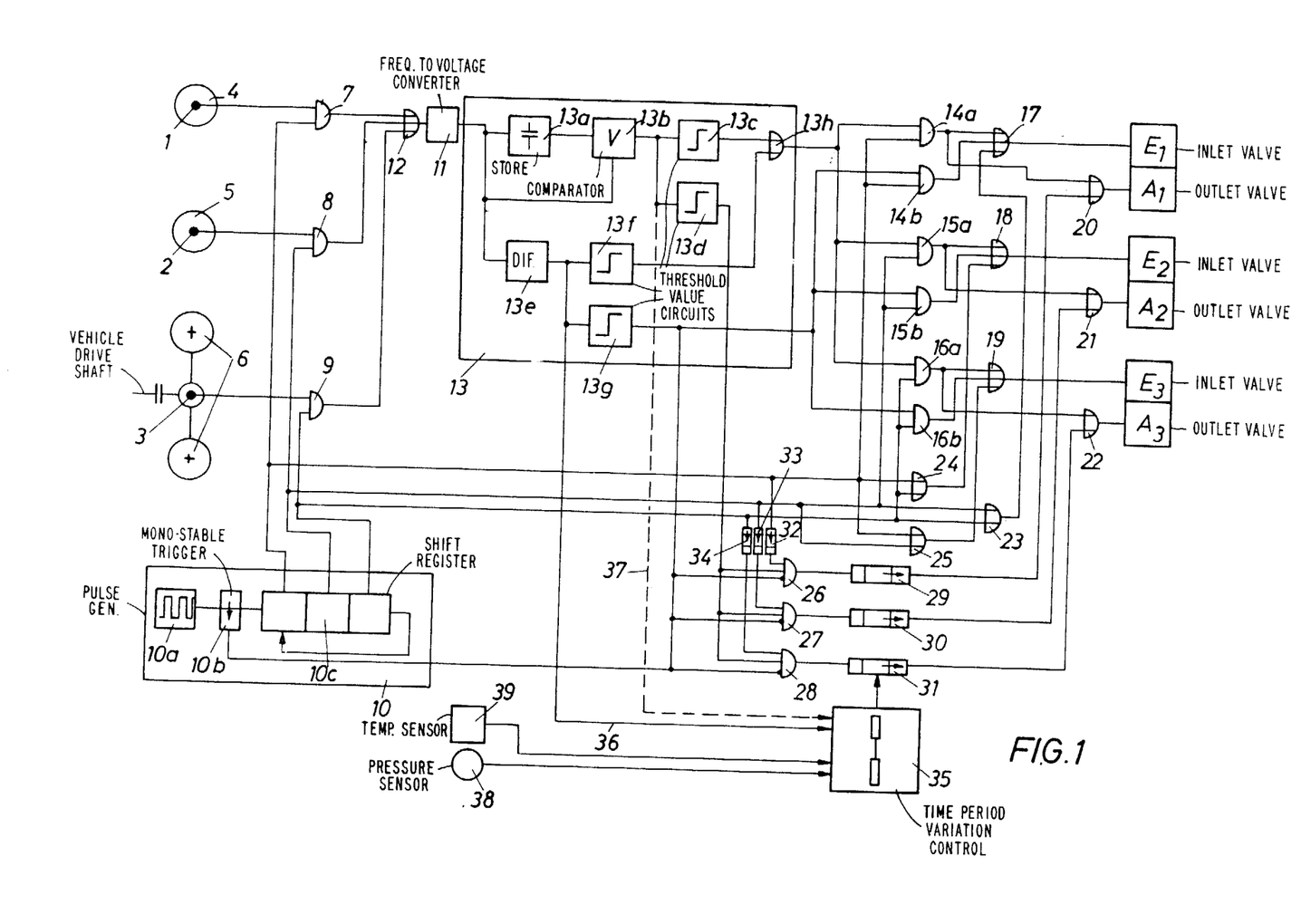
FIG. 1 shows an embodiment of the invention in detail.

Referring now to the drawings, in the embodiment of FIG. 1 sensors 1 and 2 are provided for two front wheels 4 and 5 and a common sensor 3 for the two rear wheels 6 is mounted on the differential. The sensors 1 to 3 are so-called pulse generators, which in each case produce a pulse sequence whose frequency is proportional to the rotary speed of the wheels. The sensors 1 to 3 are connected to gates 7, 8 and 9 respectively. These gates are caused to open one after the other by signals of a clock pulse generator 10 so as to pass the pulse sequences of the sensors. These pulses then pass by way of an OR-gate 12 to a converter 11, which produces a voltage proportional to the rotary speed of the wheel from the pulse sequence. The clock pulse generator 10 provides the clock pulse on which the sensors 1 to 3 are connected one after the other to a transmission and evaluation channel. In the embodiment shown, the clock pulse generator 10 comprises a high frequency pulse generator 10a, a monostable trigger stage 10b with specified time constants and a three-stage shift register 10c. The first pulse of the pulse generator 10a sets the trigger stage 10b into its unstable state. As a result of the output pulse, resulting therefrom the shift register 10c is shifted on by one stage. After the time determined by the time constant of the monostable trigger stage 10c, it is reset and is set again by the next following pulse. In this way the shift register receives, at practically constant time intervals, pulses which switch it forward successively into its three possible positions. In each position, a signal for one of the gates 7 to 9 appears at one output. (From the last position of the shift register the latter is again switched into the first position for another run-through). The time constant of the monostable multi-vibrator 10 is such, for example, that a switchover takes place 50 times per second. The timing generator can only be brought into operation, for example, when the vehicle brakes are actuated.

The evaluation circuit 13 comprises, in the embodiment shown, a storage element 13a for forming a voltage approximating the vehicle speed from the voltages corresponding to the wheel speeds, a comparator element 13b for comparing this voltage with a wheel speed voltage to produce a slip signal, threshold value stages 13c and 13d for this slip signal, a differentiating element 13e for the wheel speed voltages and threshold value stages 13f and 13g for the voltage produced in the differentiating element 13e.

If a vehicle wheel has a predetermined deceleration (threshold value stage 13f) and/or a certain wheel slip (threshold value stage 13c), then a signal passes by way of OR-gate 13h to the AND-gates 14a to 16a. The AND-gates 14a to 16a are connected in synchronism with the gates 7 to 9 by the timing generator 10 so that a signal present at the output of the OR-gate 13h, which signal corresponds to the just connected sensor arrives at valve combinations (inlet and outlet value) $E_1/A_1$ to $E_3/A_3$ associated with one of the sensors 1 to 3 and thus varies the pressure in the brake channel associated with the connected sensor. With the presence of an output signal at the OR-gate 13h this signal passes by means of one of the AND-gates 14a to 16a and from there by means of associated OR-gates (17 to 19) to the associated inlet valve $E_1$ to $E_3$, which results in a closure of this valve, at the same time, however, the associated outlet valve ($A_1$ to $A_3$) is controlled by means of one of the OR-gates 20 to 22 and is opened thereby. Thus there is a pressure reduction in the associated braking channel.

By means of the OR-gates 23 to 25, the inlet valves in the brake channels, associated with the sensors which are not at that time connected, are closed. Thus "maintain constant pressure" is effected in these channels. If necessary, care must be taken for the signals of the OR-gates 23 to 25 to be operative only during a control operation, which, for example, can be made possible by the timing generator 10 being operative only in the case of continuous control.

Since in the case of the present control concept, at a certain wheel acceleration a "maintain constant pressure" is to be effected, the signal of the threshold value stage 13g indicating a certain wheel acceleration, passes to AND-gates 14b to 16b, of which, together with one of the corresponding AND-gates 14a to 16a, one is opened and the signal of the threshold value stage 13g is permitted to pass to the corresponding inlet value ($E_1$ to $E_3$) to keep the pressure constant.

In the present embodiment, a pressure reduction in an individual channel is undertaken beyond the clock pulse end if a predetermined wheel slip (which is higher compared with the wheel slip determined by means of the threshold value stage 13c) is present at the associated wheel towards the end of the clock pulse. This wheel slip is determined by means of a threshold value stage 13d. The output signal of this threshold value stage passes by means of one of the AND-gates 26 to 28 to one of the time elements 29 to 31, which extend the fed-in signal by a predetermined time. The AND-gates 26 to 28 are opened one after the other by the timing generator 10. Of course, on account of the correspondingly dimensioned time elements 32 to 34, which delay the passage of the signal, they are opened only towards the end of the clock pulse so that only at the presence of the high slip value towards the end of the clock pulse does a storage in the time elements 29 to 31 take place. If storage takes place in a time element, then the output signal of this time element causes, by way of one of the OR-gates 20 to 22, a (further) energization of the corresponding outlet valve ($A_1$ to $A_3$) beyond the end of the clock pulse, this is to say causes a further pressure reduction.

This reduction can last for a period corresponding to the preselectd time constants of the time element; the time, however, can also be varied according to certain parameters. In the drawing, this additional variation is indicated for the time element 31 by the block 35. The variation for the other time elements is not shown for the sake of simplicity. By this block, for example, the discharge resistance of the time element 31 is varied in accordance with certain parameters. Here an increase in the discharge resistance is to be effected (line 36) corresponding to the level of the deceleration voltage at the output of the differentiating element 13e. The deceleration voltage can correspondingly influence a voltage-dependent resistance for this purpose. Correspondingly, the level of the slip voltage — as shown by a broken line — could influence the level of the discharge resistance (line 37). However the controlled pressure can also be measured for the associated brake channel (pressure sensor 38) and the voltage corresponding to the pressure value can be used to influence the discharge resistance, i.e. as the pressure becomes greater a reduction in the discharge resistance occurs. Furthermore the temperature of the pressure medium can also be used in the same manner as the pressure (temperature feelers 39).

Also, or in addition, a higher deceleration value voltage can be fed to one of the time elements 29 to 31 to initiate the storage instead of the signal of high slip value.

In accordance with a further development of the invention, the occurrence of a wheel acceleration at one wheel will prevent storage in the time elements 29 to 31. This is taken into account in the drawing in that the output signals of the threshold value stage 13g block the AND-gates 26 to 28 as a result of being connected to an inverting input. In a favorable manner, in the case of a large slip and great vehicle speed, storage is not prevented with the occurrence of the wheel acceleration; this has not been shown in the drawing.

Further in addition, in the drawing, the possibility has been shown of shortening the individual clock pulses. In the present example, this is carried out if a predetermined wheel acceleration occurs. For this, the output voltage of threshold value stage 13g is fed to the multivibrator 10b to effect immediate resetting into the starting position. In the case of this additional influencing of the timing generator, in the embodiment shown, actuation of the inlet valves $E_1$ to $E_3$ by the acceleration signal by way of the AND-gates 14b to 16b can be dispensed with. This resetting can, if a short running of the clock pulse time is also desired, be effected also by means of a time delay element. Such a time element would also be used for this form of embodiment, if any shortening of the clock pulse time is to be achieved by means of a deceleration signal. To extend the clock pulse time, for example, in the case of a large slip signal, the response of the monostable multivibrator 10b should be prevented for a certain time after resetting.

Figure 2:
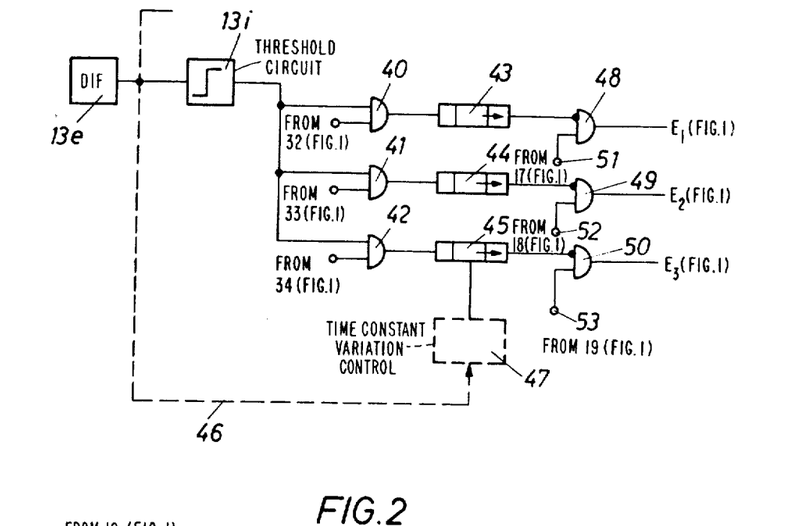
FIG. 2 shows another embodiment, which can also be used in connection with the embodiment of FIG. 1.

In the case of the embodiment according to FIG. 2, a pressure increase after the end of the clock pulse should be achieved under certain conditions. Only the elements important for this are shown.

Yet another threshold value stage 13i, which produces an output signal at a higher wheel acceleration, is connected after the differentiating element 13e of FIG. 1. The signal passes by way of AND-gates 40 to 42, the other inputs of which are connected to the time elements 32 to 34, to one of the time elements 43 to 45 towards the end of the clock pulse. These time elements 43 to 45 correspondingly extend this signal. The time constants of these time elements may be variable, thus, for example, varied corresponding to the level of the wheel acceleration (line 46, block 47). An output signal from one of the time elements 43 to 45 passes to the inverting input of one of the AND-gates 48 to 50 and blocks it in dependence on the time constant. Since the terminals 51 to 53 of these AND-gates 48 to 50 are connected to the outputs of the OR-gates 17 to 19, energization of the associated inlet valve ($E_1$ to $E_3$) is prevented with the occurrence of a signal at the output of one of the time elements 43 to 45, i.e. a pressure build up (extended) occurs.

In the case of the two above described embodiments, continuous variations of the time constants of the time elements was discussed. However a variation of the time constants in steps is also possible.

Figure 3:
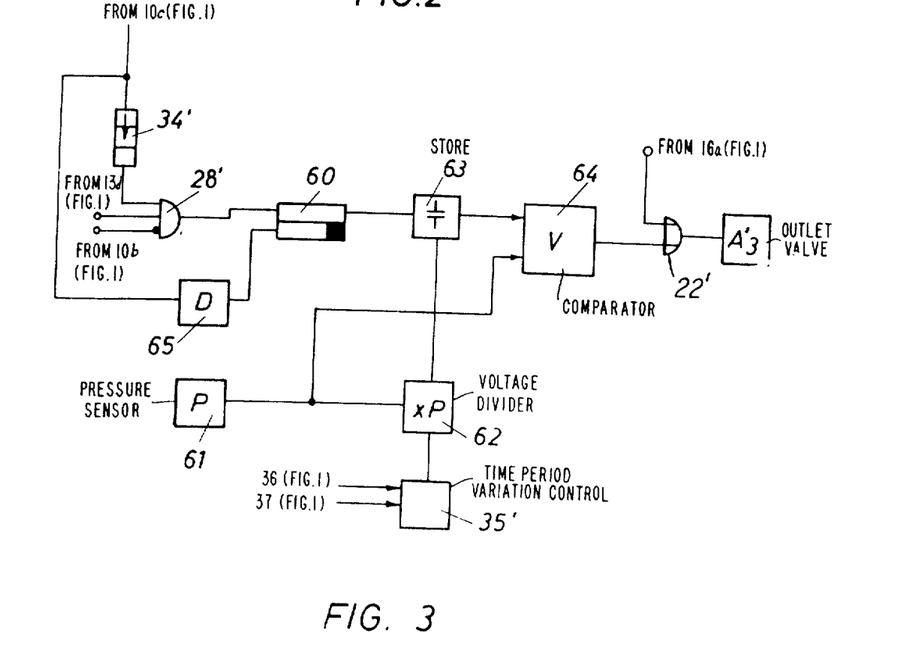
FIG. 3 shows an embodiment with storage of a value dependent on the desired pressure.

In the case of the embodiment of FIG. 3, no extension for a predetermined time is undertaken but during the subsequent storage a control of the pressure to a desired value is carried out. For the sake of simplicity, only a subsequent storage branch for one outlet valve is shown here, it being assumed that the branch formed from the elements 34, 28, 31, 35, 22 and $A_3$ of FIG. 1 is replaced. The parts taken over from FIG. 1 and having entirely the same parameter like the time element 34, the AND-gate 28, the OR-gate 22, the block 35 and the valve $A_3$ therefore have the same reference numerals in FIG. 3 with merely an additionally "'".

If a corresponding wheel movement behavior (here a certain slip without additional acceleration) is present toward the end of the clock pulse time, then the AND-gate 28' produces a signal and thus puts a bistable stage 60 in the state in which a signal appears at its upper output. A pressure sensor 61 continuously feeds a voltage corresponding to the (control) pressure value present in the associated channel, to a voltage divider 62, the divider ratio being varied by the block 35', that is to correspond to the value of the fed-in deceleration and/or slip. The voltage produced by the divider 62 is in this case smaller, the higher the slip and/or deceleration. With the appearance of the output signal of the bistable element 60, the instantaneously present output voltage of the divider 62, which voltage is dependent on the pressure, is stored in a store 63. The voltage of the pressure sensor 61, corresponding to the instantaneous pressure value, is compared with this desired voltage value in a comparator element 64. In this case a signal is fed to the outlet valve $A_3$ until the actual pressure has fallen to the desired pressure value. The desired pressure value remains stored until the next clock pulse time begins for the channel in question. Then the bistable element is reset into the starting position by means of the clock pulse signal fed to the time element 34' with the help of the differentiating element 65. Only a new output signal of the AND-gate 28' towards the end of the clock pulse time can again set the bistable element 60.

Figure 4:
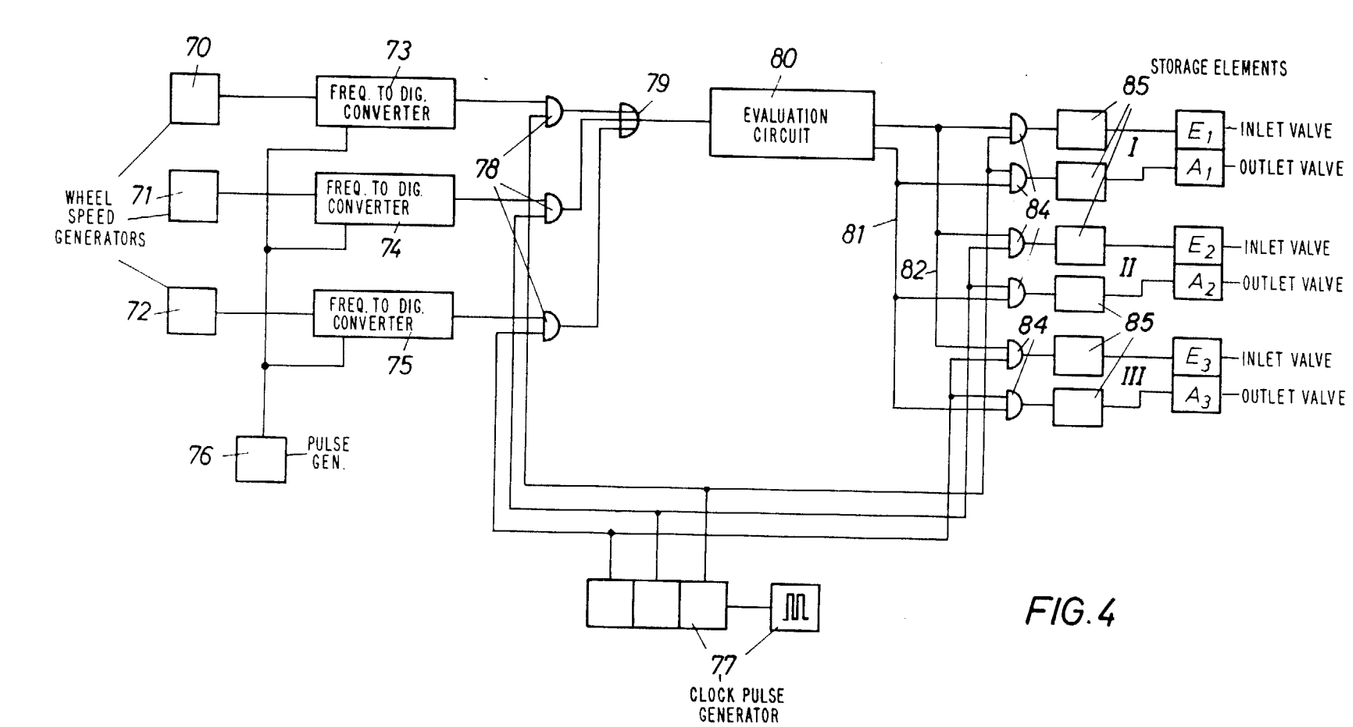
FIG. 4 shows a basic circuit diagram of another embodiment.

Three wheel speed generators are provided in the case of the embodiment of FIG. 4 and are given the reference numerals 70, 71 and 72. These generators give a pulse sequence proportional to the rotary speed to the measuring elements 73, 74 and 75, which produce a digital value of the measured speed at their outout. The measuring elements 73 to 75 each contain, for example, a counter, into which pulses of the high frequency pulse generator 76 are counted, during the period of the pulses of the generator 70 or of a duration dependent thereon. The state of the counter, which depends on the measured result, is fed at the end of the measurement, into a digital intermediate store likewise contained in the elements 73 to 75, so that the counter can be used for the renewed speed measurement. The measured values present in the stores are fed one after the other through the gate 78 and the OR-gate 79 of the evaluation circuit 80 under the control of the clock pulse generator 77 which, to a large extent, corresponds to the clock pulse generator 10 in FIG. 1. In the evaluation circuit 80, control signals are produced from the fed-in signals on two output lines 81 and 82. Gates 84 are likewise controlled by the clock pulse time generator 77 and are opened alternately in pairs. The control signals generated by the individual generator signals are fed thereby to the control channel (I, II or III) associated with the individual sensor and there stored in storage elements 85. The signals stored in the stores then effect a control of the inlet valves $E_1$ to $E_3$ and outlet valves $A_1$ to $A_3$ corresponding to the detected rotary speed behavoir of the associated wheel.

Since the clock pulse time in the case of this embodiment is determined only by the evaluation time of the evaluation circuit 80, the clock pulse can be very rapid (switch on time of a few msec.). The stored signals can therefore be operative from the time of storage to the time at which the storage signal is changed by a later switching of the evaluation channel to the corresponding store elements.

Figure 5:
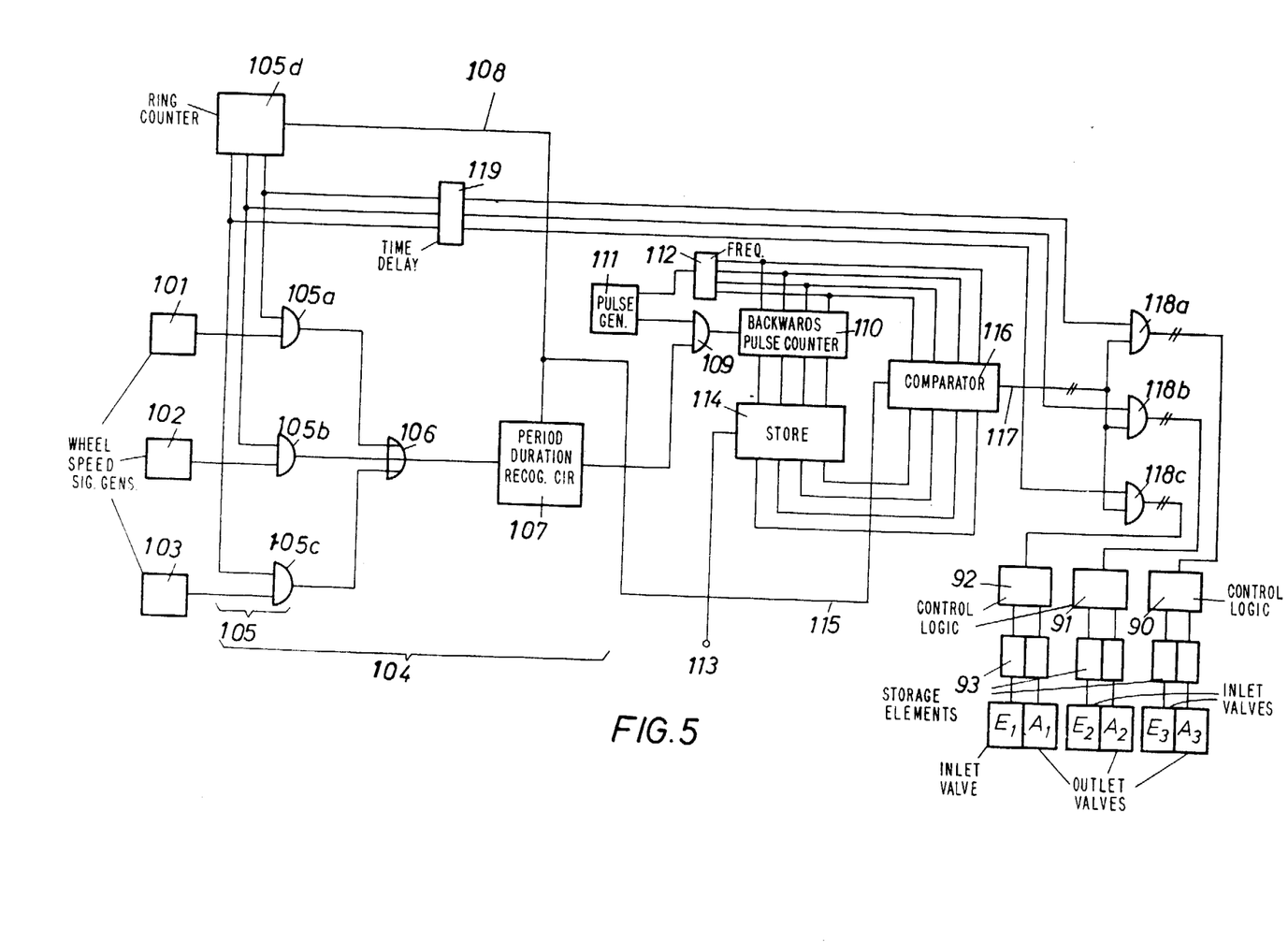
FIG. 5 shows an embodiment with clock pulse time dependent on the period duration of the sensor signals.

FIG. 5 shows a further embodiment of the invention. There 101 to 103 are the references of three wheel speed signal generators (one each at the wheels of a front axle and one for the rear axle). These signal generators supply pulse sequences, the frequency of which depends on the rotary speed of the wheels, to switch means 104 for the successive switching through of a signal generator. These switch means here comprise an input circuit 105, which includes three AND-gates 105a to 105c and a ring counter 105d having three stages and a circuit 107 for recognizing the period duration. In each of the positions of the ring counter 105d, it connects one of the signal generators 101 to 103 to the OR-gate 106 and thus to the input of the circuit 107 for determining the period duration. An embodiment of such a circuit is shown in greater detail in FIG. 6. Therefore it should be merely pointed out that this circuit is in the waiting position with the switching on of a signal generator and waits either for the next following start of a period of the pulse sequence coming from the switched on generator or — as is shown later by reference to FIG. 6 — uses each following flank or pulse edge for measurement of pulse duration. At its output, the circuit 107 produces a pulse which corresponds with the length of one period of the fed-in pulse sequence. The end of this pulse then causes the switching forward of the next signal generator by means of the line 108.

The gate 109, the pulse counter 110 and the high frequency pulse generator 111 are provided for measuring the period duration of the pulse produced by the circuit 107 and thus the wheel speed. The output signal of the circuit 107 opens the gate 109 for the duration of the pulse and thus allows a pulse quantity dependent on the rotary speed to pass to the counter 110. If the frequency of the pulse generator 111 were constant and the counter 110 a forward counter, then the number of pulses entered at the end of the output signal of the circuit 107 would be proportional to the period duration, but inversely proportional to the pulse sequence frequency of the signal generator pulse sequence. However, since a proportionality between the number of pulses and the pulse sequence frequency is sought, the counter 110 is constructed as a backward counter, which, in each case, at the start of the period duration is set to a specified digital value, which is related to the starting frequency of the pulse generator 111 and the highest possible occurring pulse sequence frequency of the sequences of the generators 101 to 103. In addition the sequence frequency of the pulse generator 111 continuously reduces from a starting value with increasing period duration in accordance with the expression ($1/T^2$), wherein $T$ is the period of a generator. An indication of this is provided by the control element 112, which senses, in each case, the state of the counter 110 and influences the pulse generator 111 accordingly. In practice this frequency change is undertaken in steps such that the number of pulses fed to the counter 110 approximates well at each point in time the pulse number in the case of continuous frequency variation. Because of these two measures (backward counting and frequency variation) the desired proportionality between pulse quantity and sequence frequency are obtained at the counter 110.

At the beginning of the brake operation, storage of the measured rotary speed is effective in the store 114 through terminal 113. This store can be discharged slowly and is, in the case of a higher digital value (it does not matter from which wheel this is derived) in the counter 110, charged to this value. The stored value serves as the reference value. This reference value is compared, at the end of the duaration of the pulse initiated by a control signal over line 115, in the comparator 116 with the instantaneous wheel speed value. In the case of a relatively low instantaneous wheel speed, the comparator 116 feeds, according to the amount of the deviation, a slip signal to a line of the multiple line 117. Since the gates 118a to 118c operate in a somewhat delayed manner (time element 119) as compared with the gates 105a to 105c, this produced slip signal passes by way of one of the gates 118a to 118c to one of the logic units 90 to 92 which influences the brake pressure at the wheels. In these logic units, for example, with the occurrence of a small slip value, a control signal is produced on one output line, and with the occurrence of a higher slip value a control signal is produced also on the other output line. The signals on these output lines act through store elements 93 on the inlet valves $E_1$ to $E_3$ and outlet valves $A_1$ to $A_3$, wherein they maintain a predetermined influence on the pressure for at least a time even after switching forward of the switch means 105 and 118. It is worth mentioning that here the logic unit is provided outside the common evaluation channel.

Figures 6, 7:
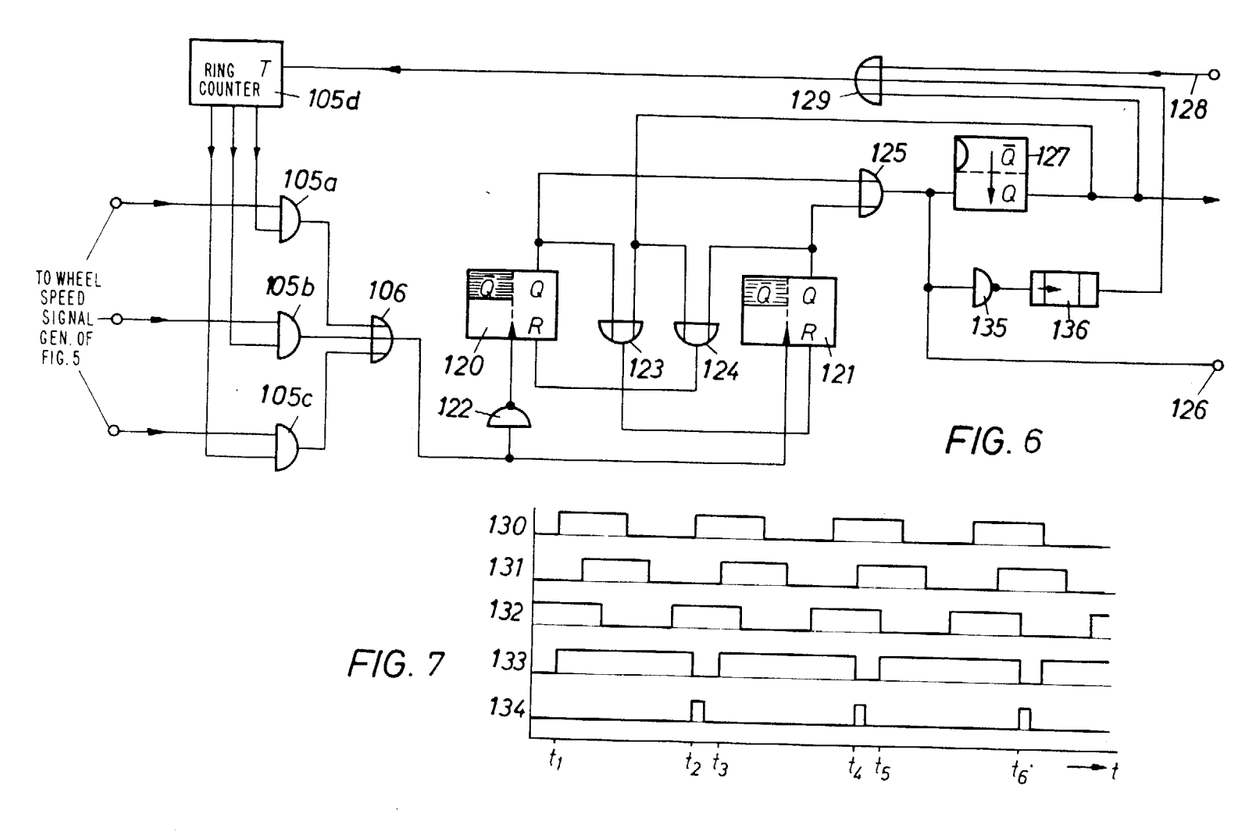
FIG. 6 shows a possible form of embodiment of part 104 of FIG. 5.
FIG. 7 shows a pulse diagram to explain the operation of the circuit of FIG. 6.

FIG. 6 shows an embodiment of the circuit 104 for the alternating or sequential connection of the generators in a detailed form. The three gates 105a to 105c as well as the ring counter 105d and the OR-gate 106 correspond to the parts also shown in FIG. 1. Two bistable trigger circuits 120 and 121 are connected to the OR-gate 106, that is to say one directly and the other through an inverter element 122. As a result of this connection, one bistable trigger circuit responds in the case of negatively moving pulse flanks i.e., leading as trailing edges and the other responds in the case of positively moving pulse flanks of the fed-in pulses. After the response of a bistable trigger circuit, the other bistable trigger circuit is prevented from responding by means of the OR-gate 123 and 124. The output signal of the switched-over bistable trigger circuit passes by way of OR-gate 125 to the terminal 126 connected to the gate 109. Only the pulses coming from the connected generator with the same flank direction can reset the set trigger circuit 120 or 121. In doing this, a monostable trigger circuit 127 is momentarily set by the rear flank, i.e., trailing edge, of the signal supplied to the terminal 126. The resultant control signal serves as a signal for further switching of the ring counter 105d and, for example, also for initiating the comparision in the comparator 116. The setting of the monostable trigger circuit 127 moreover prevents any response of the trigger circuits 120 and 121 during the duration of the control signal by way of the OR-gates 123 and 124.

In FIG. 7 130, 131 and 132 show curves of the pulse sequences of the generators 101, 102 and 103, which are phase-displaced with respect to each other. It is assumed that, at the point in time O, the gate 105a is switched through. Then the trigger circuit 121 responds to the positively moving flank of the pulse of the curve 130 at the point in time $t_1$. On account of the blocking of the other bistable trigger circuit, the negative moving flank has no effect. Only when a positive moving flank appears again at the point in time $t_2$ is the trigger circuit reset. At the terminal 126, a signal 133 appears between the time $t_1$ and the time $t_2$ which signal is initiated by the generator 101 and length of which corresponds to the duration period of the pulse sequence of the generator 101. When the rear flank of the signal pulse appears at the terminal 126 at time $t_2$, the monostable trigger circuit 127 is set and a short control pulse 134 connects the next generator. From the end of the control pulse 134 one of the trigger circuits 120 and 121 can again respond. In the example, trigger circuit 121 responds again and produces the following pulse of the pulse sequence 133 ($t_3$ to $t_4$). However, after connecting the generator 103 the trigger circuit 120 responds to the negative moving flank and produces the pulse arising between $t_5$ and $t_6$. Thereafter the cycle starts again.

In the case of the embodiment of FIG. 6, a control line 128 is provided. By means of this line 128 and the OR-gate 129, the ring counter can be switched forward. A signal appears at this line if the wheel associated with the connected generator has a very low speed. A signal could, for example, be initiated if the pulse counter 110 exceeds a predetermined value, for example, runs over. A negator element 135 and a delay element 136 are provided in order to prevent any persistence of connection to one generator in the case of an already locked wheel. The time constant of the time element is chosen to be somewhat larger than ($T_r$ min/2). If the spacing between two pulses of the line 133, in FIG. 7, is greater than this time constant, which can only occur when the wheel is stationary, then the delay element 136 produces a signal for further connection to the ring counter by way of OR-gate 129.

As previously described, the generators 101 to 103 were in each case connected only for the period duration or for a time dependent thereon. However it is also possible, in accordance with the invention, to interrupt switching forward under certain circumstances and to undertake control of one wheel. If, for example, it is determined at the end of $T$ that a pressure reduction is necessary (e.g. as a result of a predetermined wheel deceleration or slip), then the switching forward can be stopped, until a re-acceleration of the wheel is started and only then is the next generator connected. Here, a small delay of the switchover would of course be necessary after $T$.

In accordance with a further form of the invention, the generators could be connected with a multiple of the connection time ($T$) at low speeds as compared with higher speeds (e.g. above 150 km/h; the connection time is thus varied in dependence on speed, e.g. increased to 2 or 3 periods. By this means, the method of measurement of the speed is simplified, particularly the pulse frequency of the pulse sequence counting the period duration $T$ or the time period dependent thereon can be reduced.

In accordance with a further form of the invention the equipment can be so constructed that, within one cycle, the connection of a generator to the channel can be left out, that is to say the generator can be by-passed. This method can be used, for example, if, at a preceding connection of the generator, an acceleration was determined for the wheel and as a result a slow pressure rise is carried out by means of the subsequent storage device. Instead of an acceleration, the determination in a preceding cycle that the wheel slip is decreasing could also result in a by-pass. In general it can be said that such a by-pass is possible if, because of the determination in a preceding cycle, it is to be expected that the wheel will be found to have the same tendency as in the preceding connection phase, so that a variation of the pressure contact is not necessary. It should be pointed out, that the measurement of the length of the output pulse of circuit 107 can also be done in another manner.

It will be understood that the above description of the present invention is susceptible to various modifications, changes and adaptations.

What is claimed is:

1. An antilock control system for the braking system of a wheeled vehicle comprising at least two sensors, each associated with a different wheel or group of wheels of the vehicle and providing signals related to the rotary behavior of the wheels, an evaluation channel for evaluating signals fed to it from said sensors, first switching means for connecting said sensors to said evaluation channel in succession in a rhythm independent of the control channels for controlling brake pressure at the wheels associated with said sensors, second switching means acting in synchronism with said first switching means for switching the output of said evaluation channel in succession to said control channels, and storage means connected into said control channels for storing signals from said evaluation channel for use in the associated control channel when said associated control channel is disconnected by said second switching means from said evaluation channel.

2. A system as defined in claim 1, and further comprising a clock pulse generator for controlling said first and second switching means to feed said signals of said sensors to said evaluation channel in a predetermined timing sequence.

3. A system as defined in claim 2, and further comprising intermediate storage devices for storing said signals of said sensors and means connecting said intermediate storage devices to said first switching means.

4. A system as defined in claim 2, and comprising means for connecting said sensors directly to said first switching means.

5. A system as defined in claim 1, wherein said first switching means comprises a timed switching means for connecting said sensor signals to said evaluation channel for a time period dependent on the reciprocal of the frequency of the pulses of the one of said sensors being connected.

6. A system as defined in claim 5, wherein said timed switching means comprises switching means whose timing period is the said reciprocal of said frequency of said pulses.

7. A system as defined in claim 5, wherein said timed switching means comprises an input circuit, a determination circuit for determining the time period duration of the pulses of said sensors and a control connection between said input circuit and said determination circuit for connecting the next following sensor at the end of a time period duration and means connecting said circuits to said evaluation channel for providing signals to said evaluation channel corresponding in length to a time period dependent on said time period duration initiated by leading and trailing edges of said pulses.

8. A system as defined in claim 7, wherein said determination circuit comprises a first branch responding only to pulse leading and trailing edges moving negatively, a second branch responding only to pulse leading and trailing edges moving positively and means for blocking one said branch when said other said branch is responding.

9. A system as defined in claim 7, wherein said determination circuit comprises a first bistable element responsive to negatively moving leading and trailing pulse edges and a second bistable element responsive to positively moving leading and trailing pulse edges.

10. A system as defined in claim 9, wherein said determination circuit further comprises a negator element connected in front of one of said bistable elements.

11. A system as defined in claim 7, and comprising a time element responsive to trailing edges of said pulses and producing a short control signal for connection of said next following sensor to the evaluation channel.

12. A system as defined in claim 11, and comprising means for blocking said determination circuit for the duration of said control signal.

13. A system as defined in claim 7 and comprising means for determining a minimum wheel speed and producing a signal for immediate connection of said next following sensor.

14. A system as defined in claim 1, and comprising time control means for varying the time period in which a control of brake pressure to said wheel brakes is effected by said storage means.

15. A system as defined in claim 14 and comprising brake pressure dependent means for reducing said time period with increasing brake pressure of the associated wheel.

16. A system as defined in claim 14, and comprising temperature dependent means for reducing said time period with increasing temperature of the brake medium.

17. A system as defined in claim 1, and comprising operative means for rendering said storage means operative with a predetermined deceleration of said wheels to reduce brake pressure.

18. A system as defined in claim 17 wherein said operative means comprises means for rendering said storage means operative if a predetermined deceleration is present towards the end of a clock pulse signal.

19. A system as defined in claim 17, and comprising deceleration dependent means for effecting an extension of said time period in which a control of brake pressure to said wheel brakes is effected by said storage means with an increase in the level of said deceleration.

20. A system as defined in claim 1 and comprising operative means for rendering said storage means operative to effect a brake pressure reduction with the presence of a predetermined wheel slip of said wheels.

21. A system as defined in claim 20, and comprising wheel slip dependent means for effecting an extension of said time period with an increase in said wheel slip.

22. A system as defined in claim 21, and comprising brake pressure dependent means for reducing said time period with increasing brake pressure of the associated wheel.

23. A system as defined in claim 22, and comprising temperature dependent means for reducing said time period with increasing temperature of the brake medium.

24. A system as defined in claim 1, and comprising operative means for rendering said storage means operative to effect an increase in the braking pressure with the presence of a predetermined wheel acceleration of said wheels.

25. A system as defined in claim 24, wherein said operative means comprises means for rendering said storage means operative if a predetermined acceleration is present towards the end of a clock pulse signal.

26. A system as defined in claim 24, and comprising acceleration dependent means for effecting an extension of the time period in which said storage means is operative with increasing acceleration.

27. A system as defined in claim 24, and comprising brake pressure dependent means for increasing the operative time period of said storage means with increasing brake pressure.

28. A system as defined in claim 27, and comprising temperature dependent means for decreasing said operative time period of said storage means with an increase in temperature of the brake medium.

29. A system as defined in claim 1, and comprising a pressure sensor for producing a signal corresponding to the instantaneous controlled brake pressure, means for determining a desired pressure value from said signal of said pressure sensor and causing storage of said desired value in said storage means and comparator means for comparing said signal corresponding to said instantaneous pressure and a signal corresponding to said desired value and for producing a signal for variation of the brake pressure to bring the value of said instantaneous pressure towards said desired value.

30. A system as defined in claim 29, wherein said means for determining comprises means for causing said storage towards the end of a clock pulse signal.

31. A system as defined in claim 29 and comprising a setting and adjustment element for determining said desired value from signals dependent on the rotary behavior of said wheels.

32. A system as defined in claim 29, and comprising means for reducing the ratio of said desired pressure value to said instantaneous value with increasing wheel slip.

33. A system as defined in claim 29, and comprising means for reducing the ratio of said desired pressure value to said instantaneous value with increasing wheel deceleration.

34. A system as defined in claim 29, and comprising means for reducing the ratio of said desired pressure value to said instantaneous value with increasing a wheel slip and increasing wheel deceleration.

35. A system as defined in claim 1 and comprising a clock pulse generator for controlling operation of said first and second switching means and varying means for varying the pulse period of said clock pulse generator in dependence on predetermined rotary behavior of said wheels.

36. A system as defined in claim 35, wherein said varying means comprises means for shortening said pulse period in accordance with a predetermined wheel acceleration.

37. A system as defined in claim 35, wherein said varying means comprise means for extending said pulse period in accordance with a predetermined wheel slip.

38. A system as defined in claim 1, and comprising means for preventing said storage means from becoming operative in response to a wheel acceleration of at least one said wheel.

* * * * *